United States Patent Office 3,009,874
Patented Nov. 21, 1961

3,009,874
WELL FLUID COMPOSITION AND PROCESS
FOR USING SAME
Walter Fred Chisholm, Houston, Tex., assignor to Magnet
Cove Barium Corporation, Houston, Tex.
Filed Aug. 7, 1961, Ser. No. 129,879
24 Claims. (Cl. 252—8.5)

This invention relates to improvements in the art pertaining to fluids useful in drilling, completion and workover of wells.

This application is a continuation-in-part of my copending application Serial No. 73,488, filed December 5, 1960 (now abandoned).

The primary functions of a mud circulated through a well bore during rotary drilling are to maintain sufficient back pressure on formations penetrated to prevent blowouts, and to carry the cuttings from the drill bit to the surface of the earth. Although all drilling muds perform these basic functions, a great many secondary functions may be necessary in special circumstances. For example, when a well bore penetrates a bed of hydratable shale or other hydratable clay-like material, it may be desirable to include in the mud some material which prevents undue hydration of shales or clays. Especially in heaving shale formations is it necessary to prevent severe hydration of the formation resulting in sloughing of material into the well bore where it may cause the drill stem to stick.

Frequently, well bores will penetrate formations which may be damaged by an aqueous mud filtrate; and it is desirable to reduce fluid-loss characteristics of the mud to avoid such damage. When a well bore penetrates beds of salt or anhydrite or encounters salt water flow, the mud used must be of such type that desirable rheological properties are maintained in the presence of these electrolytes. However, the most difficult conditions for maintaining desirable rheological and fluid-loss properties in the mud are encountered when the well bore reaches great depths and the mud is exposed to high bottom-hole temperatures and extreme pressures. The mud also should have such characteristics that it prevents "balling" of the bit and assists in rapid penetration of the earth.

Water-base muds may be divided into several types or species having the following accepted nomenclature:

A. Little or no chemical treatment
  (1) Spud muds
  (2) Natural muds
B. Chemically treated (no calcium compounds added)
  (1) Phosphate treated
  (2) Organically treated
    a. Quebracho and other tannins
    b. Lignite
    c. Chrome-lignosulfonate
C. Calcium treated
  (1) Lime
  (2) Calcium chloride
  (3) Gypsum
  (4) Chrome-lignosulfonate
D. Salt water
  (1) Sea water
  (2) Saturated salt water
E. Special modifications
  (1) Oil emulsion
  (2) Low clay solids
  (3) Surfactant For several years, modified lignosulfonates containing chromium (of which there are presently five commercially available products) have been used in treating water-base muds. The chrome lignosulfonates are made by treating a lignin containing material such as, for example, waste sulfite liquor derived from the sulfite process of paper manufacture with a chromium containing salt and sulfuric acid. The chrome lignosulfonates may contain a considerable proportion of added iron although some of the chrome lignosulfonates commercially available contain no iron.

The term "chrome lignosulfonate" is used herein to mean not only a lignosulfonate which has been reacted with a chromate or a dichromate, and with an iron compound such as iron sulfate, but also refers to lignosulfonate product resulting from reaction of the lignosulfonate with chromate or a dichromate, and without any iron being present. The lignosulfonates used in this invention can be prepared by known processes and are readily available on the market. United States Patent No. 2,935,504 purports to describe one process for preparing chrome lignosulfonates.

In general, the function of chrome lignosulfonates in treating water-base mud is to control the flow properties (for example, the plastic viscosity and yield point) when used in smaller quantities, such as 5 to 10 pounds per barrel of mud, and in addition to control water loss when used in larger quantities such as, for example, from 10 to 20 pounds, and frequently about 15 pounds, per barrel. Thus, it will be seen that the chrome lignosulfonates play a dual role; that is, they control the flow properties of the mud when present in low concentration; and as the concentration is increased to relatively high values, they tend to control water loss.

For the muds listed under Section B above, chrome lignosulfonates are listed as primary treating agents and tend to provide a more inhibitive environment than phosphate, quebracho or lignite; and this allows these muds to be more easily weighted and maintained without unreasonable solids and viscosity build-up as drilling proceeds. By maintaining the chrome lignosulfonates at a concentration of about 8 to 12 pounds per barrel, the flow properties of these muds can be controlled in a desirable range; and water-loss values may be kept reasonably low. Also, these muds, when treated with chrome lignosulfonates, are less sensitive to electrolyte contamination; for example, salt contamination; than are the quebracho, phosphate or lignite treated muds so that hard make-up water can be used without appreciable difficulties. However, these chrome lignosulfonate treated muds require substantial additions of the chrome lignosulfonate daily in order to maintain satisfactory inhibition, water loss, and stable flow properties when the temperatures at the bottom of the hole are about 275 degrees F. or more. Even very high concentrations of chrome lignosulfonates, such as 15 to 20 pounds per barrel, do not impart sufficient water-loss control and temperature stability to such muds when low values of water loss and yield point are desired under hot hole conditions.

Lignite muds are not sufficiently inhibitive to prevent mud build-up and increased viscosity under contaminating conditions. They also require supplementary fluid loss control agents. The lignite is very sensitive to electrolytes such as salt, anhydrite or green cement whether hydroxide be added separately to the mud or be pre-reacted with the lignite and added in the reacted state.

The chrome lignosulfonates are also used in treating the calcium-treated muds listed in Section C above. In lime muds, the chrome lignosulfonates are substituted for quebracho since they provide a more stable mud at lower alkalinities in the presence of contaminants than does the quebracho-treated lime mud. Water losses go up markedly as the mud becomes heated even though both chrome lignosulfonate and starch are present in the system.

Chrome lignosulfonates are also used in calcium chloride (shale) control muds to control fluidity along with starch for water-loss control, and here again high temperatures tend to destabilize both the flow properties and water-loss characteristics of the mud. The same instability at high temperatures occurs when chrome lignosulfonates are used in gyp muds, even through an additional water-loss agent, such as sodium carboxy methyl cellulose, is added with the chrome lignosulfonate. Carboxy methyl cellulose is not heat stable, and it must continuously be added to gyp muds when the latter are heated to temperatures above 275 degrees F. Even with such additions water loss increases greatly at high temperatures and pressures.

Salt water and surfactant muds also have been treated with chrome-lignosulfonates; but as in the muds mentioned above the water-loss and flow properties tend to deteriorate when the muds are exposed to hot bottom-hole conditions.

It is an object of this invention to provide a drilling mud which has improved stability under conditions of high pressure and high temperature.

Another object is to provide an improved drilling mud which may be simple in composition and which greatly lowers mud costs in drilling deep hot holes.

Another object is to provide an improved drilling mud which does not become unpumpable after prolonged static conditions in deep, hot holes thereby increasing the ease of logging and fishing operations when these are necessary.

Another object is to provide a mud of the above type which controls the hydration of shales and hydratable clay-like materials through which a well bore is drilled and results in close caliper of the hole.

Another object is to provide a drilling fluid which is usable as a packer fluid, and eliminates the necessity for a special packer fluid and the cost of preparing the same.

Another object is to provide a mud in which chrome lignosulfonate, alkali metal hydroxide, and alkali metal chromate or dichromate and lignite are used to control the yield and water-loss values of the mud.

Another object is to provide an improved process for drilling a well wherein desirable rheological and fluid loss properties of the drilling mud are easily maintained, especially under conditions of high temperature and pressure.

Another object is to provide a process for improving rheological and water loss values of a well fluid comprising a hydratable clayey material dispersed in an alkaline aqueous phase.

Other objects, advantages and features of novelty will be apparent to one skilled in the art upon consideration of this specification and the appended claims.

The present invention is based upon the discovery of a synergistic effect of chrome lignosulfonate and a chrome-lignite material in controlling rheological and fluid loss properties of well fluids. This effect is so pronounced that deep hot wells can be drilled with cheap and simple muds containing only water, a clayey material such as bentonite, drilled solids which usually contain lower grade clayey materials, a chrome lignosulfonate, the chrome-lignite material, sufficient caustic to give the mud a pH of 7.0 or above, preferably in the range from pH 7.5 to 10.0, and barite, when the latter is needed to increase the weight of the mud. The presence of drilled solids is not necessary for proper functioning of the drilling mud, but their inclusion is merely incidental to the drilling operation. The chrome lignosulfonate and chrome-lignite material, when used together, effectively control rheological and water loss properties of water base muds, even under adverse conditions, such as the presence of appreciable quantities of electrolytes and high temperatures and pressures. In fact fluid loss from such muds usually becomes lower as pressure upon the mud increases. Such muds have a strong hydration inhibiting effect on hydratable clay-like materials such as heaving shales.

Because of their simplicity, relatively low cost and unusual stability water base muds containing chrome lignosulfonate and a chrome lignite material may be considered as an entirely new system of muds, in which there is a return to simplicity comparable with the simplicity of muds in general use prior to 1940, when well depths were limited and extreme pressures and high temperatures were not encountered.

Although chrome lignosulfonate and chrome-lignite material preferably are used in the simple muds described above they can be added to the more complex and expensive water base muds, as, for example, gypsum and calcium chloride muds, and their synergistic effect is still attained. Addition of these materials to such muds may be indicated when the complex mud is already in use in a well and it is desired to break it over to a mud having increased stability.

In the attached drawings

All values for properties of muds shown in the drawings or given in the specification were obtained by standard A.P.I. procedures.

One preferred chrome lignite material of this invention is a reaction product made by reacting lignite with a chromate material selected from the group consisting of alkali metal chromates and dichromates, such as sodium chromate, potassium chromate, sodium dichromate, etc. in amount equivalent to 5 to 25 pounds of sodium dichromate dihydrate per 100 pounds of lignite, in the presence of sufficient water to enable the reaction to proceed. An alkali metal hydroxide, such as potassium or sodium hydroxide in quantity at least sufficient to neutralize the product, also is added and enters into the reaction.

In a preferred method for preparing this reaction product, lignite containing about 10 to 15 percent of moisture is placed in a mixer-muller, and the proportions of sodium dichromate and potassium hydroxide given above are added. The potassium hydroxide is added as a concentrated aqueous solution, preferably about 50 percent, and sodium dichromate as a concentrated aqueous solution, preferably about 69 percent, although solutions from 60 percent up to saturation may be used if available with substantially no variation in effect.

These ingredients are intensively mixed in the muller, and during the mixing, heat of reaction usually increases the temperature of the mixture from atmospheric temperature to about 180 degress F. or higher, frequently from 200 degrees to 240 degrees F. After about fifteen minutes mulling, the reaction product appears dry and free flowing but actually contains from about 18 to 25 percent moisture. The moist product preferably is ground in a roller mill with application of sufficient heat to at least partially dry it. A moisture content of about 10 to 15 percent in the finished product is a desirable level, but the quantity of moisture in the finished product is substantially immaterial so far as utility of the product goes. The reduction of moisture, however, is desirable in the product for reduction of shipping weight.

A less preferred method of making the product is to start with raw lignite which may contain up to 40 percent water and then add sufficient water to form a slurry before the chromate material and alkali methyl hydroxide are added. The amount of water added separately or contained in the lignite can vary, but in general a total solids content of 10 to 30 percent is desirable for ease in handling. However, the reaction product from this slurry type process is rather difficult to dry on the usual types of drum driers, and this procedure is therefore a less desirable one, especially since the mulling process does not require the presence of much water and yields a product having less moisture content before drying.

In either case, sufficient time is allowed for reaction to occur. For example, in one preferred method for conducting the mulling type preparation on full commercial scale, 1,150 pounds of lignite containing 10 to 15 percent moisture is placed in a mixer-muller, and 100 pounds of sodium dichromate dihydrate in aqueous solution are added thereto and are mulled for about one minute. Four hundred pounds of a 50 percent aqueous potassium hydroxide solution are then added at a rate which requires about three minutes for addition. The entire mixture is then mulled for about 15 minutes. During this time, the temperature of the mixture in the muller rises to a temperature of in the range from about 180 degrees to 240 degrees F., usually from about 220 degrees to 240 degrees F. The total moisture content of the mixture in the muller is then about 18 to 20 percent; and the product is apparently dry and free flowing. This hot product is then removed from the muller, and in the normal course of operation is dried to a final moisture content of about 10 to 15 percent, preferably during grinding in a roller mill.

When the slurry method of preparation is used, a preferred method of procedure is to add the required amount of chromate material to a slurry of lignite in water and allow this mixture to stand from 15 minutes to about three hours at an elevated temperature, preferably in the range from about 160 degrees to 180 degrees F. The hydroxide, which preferably is potassium hydroxide, is then added; and the reaction is allowed to proceed for another 15 minutes to several hours. The resulting slurry is then dried in any known manner which involves heating of the slurry and the final solid product to a temperature above the boiling point of water. Tray, spray or rotary-drum driers can be used.

In general, it has been found best to effect at least the final stages of heating the product from the slurry process at a temperature above 250 degrees F. but below the temperature at which the lignite components pyrolize. A relatively short period of heating at such temperature is permissible as, for example, from 30 seconds up to several minutes, and the heating at such high temperatures can be continued for longer times if desired. In either case, the heating seems to cause a further improvement in the product, perhaps due to the very complex chemical structure of lignite, but the character of any such reaction is not known.

While the description of a slurry process given above sets out a preferred order of mixing, this order is not critical; and the chromate and hydroxide can be added simultaneously to the lignite. However, the above order seems to produce a somewhat superior product when a slurry process is used.

The amount of the chromate material to be added can vary over a substantial range which may be expressed as an amount chemically equivalent to from 5 to 25 pounds of sodium dichromate dihydrate per 100 pounds of dry lignite.

In making one preferred product, an amount equivalent to about 8 pounds of sodium dichromate dihydrate is employed per 100 pounds of lignite (dry basis); i.e., the weight ratio of lignite to sodium dichromate dihydrate is about 12:1. It is preferred that the sodium dichromate dihydrate be used in the range from 7 to 14 pounds per 100 pounds of lignite.

The amount of hydroxide to be used should be that required to cause the product to have a pH of at least 7 and preferably of about 10. The amount used will be dependent not only on the final pH selected but also on the nature of the chromate material employed. For example, when sodium dichromate is used, much more hydroxide will be necessary than when a chromate is selected because of the greater inherent acidity of the dichromate. Thus, where 9 pounds of sodium dichromate is used per 100 pounds of dry lignite, about 27 pounds of potassium hydroxide per 100 pounds of lignite will neutralize the product to pH 10.

It is preferred to use potassium hydroxide in preparing the product. The potassium in the final product tends to make mud systems more inhibitive toward solids build-up; that is, tends to permit more clay solids to come into the system without a corresponding increase in yield value. It is thought that the potassium becomes fixed to the clay particles and as a result decreases the hydrating effect of sodium ions normally present in water-base muds.

When the chromate material used is potassium chromate or potassium dichromate, it is still preferred to use potassium hydroxide in order to maintain the sodium ion concentration of the product as low as possible. However, when potassium chromate is chosen and the pH of the final product is to be in the lower part of the alkaline range, it may be possible to eliminate the hydroxide altogether. Usually a high pH product, as for example about pH 10, is desired; and the hydroxide will be employed in such cases.

It is recognized that sodium hydroxide can be used instead of potassium hydroxide but a somewhat less effective product will result.

The lignite used in preparing the reaction product is a variety of coal intermediate between peat and bituminous coal, especially one in which the texture of the original wood is distinct. It is also called "brown coal" or "wood coal." Its chemical characteristics and composition have been widely described in the literature, as for example in the Journal of the American Chemical Society, Volume 69 (1947) and in the U.S. Bureau of Mines Information Circular 7691, Parts 1 and 2, published July 1954. Lignite is to be sharply distinguished from lignin and quebracho, neither of which will yield a synergistic material having the properties of the present additive when substituted for lignite in the process of preparing the additive. Lignite contains more than 10 percent, and preferably 30 to 50 percent, of humic acid. Its molecular structure is variable and unknown, as is the molecular structure of the reaction products therefrom, made by reacting a chromater material with lignite in the presence of an alkali metal hydroxide.

The reaction product made by the mulling process and the slurry process described above are indistinguishable in their synergistic effect upon chrome lignosulfonates present in any of the water-base muds listed above. The mulling process is preferred merely because of increased ease in drying the product.

The synergistic effect enhancing the ability of chrome lignosulfonates to stabilize the rheological and water-loss characteristics of such muds can be obtained, although to slightly lesser extent, by adding lignite-chromate mixtures in un-reacted state and permitting reaction to occur in situ. Lignite, the chromate material and an alkali hydroxide, preferably potassium hydroxide, may be mixed together in apparently dry state in the proportions set forth above; and this mixture can be added to drilling muds containing chrome lignosulfonate, and the synergistic effect results. The dry, unreacted mixture is not quite as effective as the pre-reacted product made by the mulling or slurry processes, but addition of a mixture of this type to the chrome lignosulfonate mud stabilizes the rheological and water-loss properties of the mud to an extent not hitherto attained. When the mud is alkaline in nature; that is, has a pH in the range from 7.5 to pH 10 or more; it is not even necessary to include an alkali metal hydroxide in the dry mixture. A mixture of lignite and the chromate material in quantity equivalent to 5 to 25 pounds of sodium dichromate dihydrate per 100 pounds of lignite or preferably in ratio of about 7 to 14 pounds of sodium dichromate dihydrate per 100 pounds of lignite may be used without the hydroxide although it is preferred to include the above amounts of potassium hydroxide in the mixture. When hydroxide is not included in the mixture, the alkalinity of the mud must be sufficient to cause the chromate and lignite to react in order to obtain the synergistic effect.

The lignite and chromate material may be added separately to such muds, and a high degree of synergistic effect still will be attained. The difference in effect between the pre-reacted materials and a mixture of materials introduced into the mud or the same proportions of materials introduced separately into the mud is one of degree rather than of kind. Approximately the same quantities of reaction product, unreacted mixture or separate materials may be used in any of the above muds with highly beneficial effects. When the unreacted mixture or separate materials are added to the mud the materials apparently react in situ to give a reaction product substantially the same as that resulting from pre-reaction of the materials.

The total amount of the reaction product, unreacted mixture or separate materials to be employed can be in the range from 1 to 15 pounds per barrel of mud. The amount of chrome lignosulfonate present in the mud can vary over a considerable range including a 1 to 15 pounds per barrel range and usually will be from 1 to 3 times (and can be twice) the weight of chrome lignite material; but where normal amounts are used as, for example, 5 to 15 pounds per barrel, the addition of the chrome-lignite reaction product, unreacted mixture or separate materials causes an improvement in flow and fluid-loss properties, a decrease in hydration of shales and clay-like materials, improved stability toward electrolytes and high stability of the system at extreme pressures and high temperatures.

The quantities of chrome lignosulfonate used in the mud can be reduced and the added chrome-lignite product or materials will cause the flow and fluid-loss properties as well as other characteristics of the mud just mentioned to remain in a desirable range and to be improved as compared with muds having much higher concentrations of chrome lignosulfonate without the chrome-lignite additive.

Muds of the present invention have an advantage in that they may be used in drilling through beds of hydratable shales and then be used as packer muds in completion of the well, while other hydration inhibiting muds, as for example, lime and calcium chloride muds cannot be used as packer muds at high temperatures.

The chrome lignosulfonate and chrome lignite material, whether the latter be a reaction product made by a slurry or mulling process, or a mixture of apparently dry materials in proportion to yield the reaction product, may be added to the mud simultaneously or, still better added together in a single complete mixture. The latter procedure is a preferred one as it enables the preparation of a mixture containing chrome lignosulfonate and chrome lignite material at a mixing plant, and bagging the complete mixture in a single bag. Time and labor are thus saved at the well head where treatment of the mud becomes merely a matter of adding to the mud a bag or specific number of bags of complete mixture at such intervals as may be required by the particular circumstances.

The term "chrome lignite material" is used in this specification and claims to mean a reaction product made by reacting lignite with a chromate material selected from the group consisting of alkali metal chromates and dichromates in the presence of an alkali metal hydroxide and sufficient water to enable the reaction to proceed and to include an apparently dry mixture of the re-actants, because it is not known whether the reaction product results from a reaction which goes to completion, nor whether partial reaction occurs in an apparently dry mixture. For example, lignite may contain as much as 30% moisture and still be apparently dry, in that it looks and feels to be dry and may be a free flowing powder. It seems possible that normal amounts of moisture in the apparently dry lignite may enable partial reaction to occur.

To demonstrate the utility of this invention, 70 parts by weight of lignite (dry basis) were slurried with water and agitated for about 30 minutes. Six parts by weight of sodium dichromate dihydrate were then added and allowed to react for one hour, the slurry being heated to about 160 degrees to 180 degrees F. Then 20 parts by weight of potassium hydroxide were added and the reaction was allowed to continue for another hour in the same temperature range. The resulting slurry containing about 25 percent solids was then drum dried at a roll surface temperature of about 300 degrees F. Products made by the above process, and the mixer-muller process described above, are designated in the following examples as XP–20. The single designation is used since there is no noticeable difference between the products and they have the same properties and usefulness.

EXAMPLE I

*Field muds.*—Typical field muds containing from 6 to 10 pounds per barrel of chrome lignosulfonate were heated 24 hours at the temperature indicated in Table I with and without added chrome lignite material, and their characteristics were determined. The following results were obtained.

Table I

| Mud | Heating temp., °F. | Weight | pH | Yield point, lbs./100 sq. ft. | Water loss, ml. |
| --- | --- | --- | --- | --- | --- |
| Low pH-low calcium mud plus | 150 | 10.3 | 8.6 | 11 | 6.8 |
| ½ lb./bbl. XP-20 | 150 | 10.3 | 8.6 | 4 | 5.6 |
| Lime mud plus | 400 | 14.6 | 9.7 | 57 | 31.5 |
| 3 lb./bbl. XP-20 | 400 | 14.6 | 9.7 | 11 | 25.2 |
| Gyp mud plus | 150 | 16.6 | 10.9 | 12 | 6.0 |
| 4 lb./bbl. XP-20 | 150 | 16.6 | 10.6 | 8 | 4.5 |
| Sea water mud plus | 150 | | 7.8 | 28 | 8.2 |
| 4 lb./bbl. XP-20 | 150 | | 8.2 | 6 | 4.8 |

XP20 reaction products, made in some cases by the slurry process and in other cases by the mulling process, have been used in drilling more than 200 wells. Many of these wells have been completed, while others are still drilling. Examples II to VIII illustrate typical results obtained in these wells, in increased drilling rates, savings in number of bits used, ease of fishing operations, decreased shale hydration, stability of mud under conditions of electrolyte contamination, and improved mud characteristics at high temperatures and pressures due to the synergistic effect of the chrome lignite material on the chrome lignosulfonate system. No supplemental fluid loss control agents such as starch or carboxy methyl cellulose have been necessary as the cooperative synergism of chrome lignosulfonates and the chrome lignite material has maintained fluid loss at low values under all conditions encountered.

EXAMPLE II

An oil well was drilled in Harris County, Texas, to a total depth of 15,000 feet. At a depth of 10,100 feet, the mud was converted to an XP20 chrome lignosulfonate mud. The chemical treatment included equal weights of XP-20 and chrome lignosulfonate and the well was completed with a mud of this type.

As drilling progressed, the chloride content of the mud increased from 700 parts per million to a maximum of 2,200 parts per million at 11,000 feet. Bottom hole temperatures of this well were 300 degrees F. at 12,500 feet, and 348 degrees F. at 15,000 feet.

While coming out of the hole in a routine trip at 13,286 feet, the drill line broke and 8,500 feet of pipe fell into the bottom of the well, washing all rubbers off the pipe and breaking the cutting cones off the rotary bit. This occurrence necessitated a fishing job lasting 14 days during which time the mud was static in the well and at a bottom hole temperature well above 300 degrees F. When the pipe was recovered, it was found that the lower 1,200 feet of the pipe was free. Although the mud on the bottom of the well had not circulated for 14 days, it had the following properties after one circulation:

Weight _________________________________ 15.1
Viscosity _______________________________ 65
Gels ___________________________________ 0/0
Water loss____________________________ml__ 2.7

On two occasions during logging, tools were lost when the lines carrying them broke. On each occasion, the mud remained very stable although not circulated for 2 to 4 days during the time required to fish the logging line out of the well.

This mud was extremely stable throughout drilling and completion operations and was very economical in cost.

EXAMPLE III

A well in Plaquemines Parish, Louisiana, was drilled to a total depth of 9,500 feet. A low pH native mud was used to depth of 6,000 feet, and at this point XP-20 and chrome lignosulfonate were added in weight ratio of about 1:2.

A flow of salt water was encountered at 9,370 feet and this flow could not be stopped for 12 hours. A sample of mud taken at this time showed a chloride content of 8,800 parts per million.

A 300-barrel slug of mud having a weight of 10.6 pounds per gallon was made up and pumped into the hole and the well was shut in until more weighting material could be delivered from a supply house. After the weighting material arrived, mud at the surface was weighed to 11.5 pounds per gallon and was pumped into the hole. The flow was killed and the mud was conditioned in one circulation and drilling was resumed at once. No hole trouble of any kind developed during the shut-in time nor was it necessary to condition either the mud or the hole for logging at 9,500 feet. The high electrolyte concentrations encountered did not destroy the desirable characteristics of the mud.

EXAMPLE IV

A well in Kleberg County, Texas, was drilled to a total depth of 11,400 feet. In this location, there is a stratum of shale at about 8,500 feet that is very bentonitic in nature. It has been customary to drill in this area with the use of lime and gyp muds to inhibit hydration of the shale. Even with the use of lime and gyp muds, there is usually an increase of 2 to 3 feet in depth of mud in the mud pits while drilling through this strata. The mud used in this well was an XP-20 chrome lignosulfonate mud; and in passing through this stratum of bentonitic shale, depth of mud in the pits increased only ½ to 1 foot.

Chloride content of the mud used in this well varied from 2,500 parts per million to 2,000 parts per million during drilling of this well; viscosity varied from 43 to 58; and water loss varied from 3.9 to 2.0. Gel strength of the mud varied from 0/3 at 9,300 feet to 0/0 at all points below a depth of 9,718 feet. The low reading on water loss was attained at 11,400 feet; that is, at the point of maximum penetration where heat and pressure were highest; and the viscosity decreased as the well was drilled from 11,030 feet to 11,400 feet.

In addition, the cost of the XP20-chrome lignosulfonate mud was $19,500.00, as compared to $22,000.00 for the lime mud used in drilling a nearby well. In the well where the lime mud was used, a special packed mud had to be compounded to replace the lime mud at a cost of $6,000.00, while in the well used with the XP20-chrome lignosulfonate mud, the mud used in drilling the well was used as packer mud, resulting in a total savings of more than $8,000.00 in mud costs with the XP20-chrome lignosulfonate.

EXAMPLE V

A well in De Witt County, Texas, was drilled with an XP20-chrome lignosulfonate mud to a depth of 12,000 feet. The mud used in this well showed a constantly decreasing water loss from a value of 3.8 at 9,680 feet to 1.6 at 11,892 feet although chloride content of the mud increased from 900 parts per million at 9,680 feet to a maximum of 1,800 parts per million at 11,390 feet. The viscosity remained within acceptable limits and decreased in value after passing a depth of 10,162 feet. The 0- and 10-minute gels varied from 0/0 to a maximum of 0/6 during drilling of the well.

A similar well drilling through identical formations and offset from the present well was drilled with a gyp chrome lignosulfonate mud to the same depth. Mud costs for this offset well were $45,288.71 while the mud costs of the well drilled with XP20-chrome lignosulfonate mud were only $22,894.81. The XP20-chrome lignosulfonate mud thus resulted in a savings of approximately 50 percent of the mud costs.

EXAMPLE VI

A well located on Calliou Island, in Terrebonne Parish, Louisiana, was drilled from 9,500 feet to 14,691 feet using an XP20-chrome lignosulfonate mud.

An adjoining well was drilled to a total depth of 14,700 feet, penetrating the same formations but using a lime-base mud. This well required 40½ days for drilling, used 33 drill bits, and total mud cost was $15,285.00.

The well drilled with XP20-chrome lignosulfonate mud, was drilled in 30 days, using only 26 drill bits, and the total cost of mud was $10,133.00.

Savings from use of XP20-chrome lignosulfonate mud were found to total about $20,550.00, allocated as follows:

Savings on mud__________________________ $5,150.00
Savings on bits (7)_______________________ 1,400.00
Savings on days (10½)___________________ 14,000.00
                                          __________
                                          $20,550.00

EXAMPLE VII

A well in Cameron County, Texas, was drilled from a depth of 6,100 feet to 15,659 feet using an XP20-chrome lignosulfonate mud containing only water, bentonite, drilled solids, chrome lignosulfonate, XP20 and barite. Bottom hole temperatures encountered were in excess of 300 degrees F. The water-loss characteristic of the mud before breakover at 6,100 weet was 8.3 ml. and after conversion dropped to 2.0 ml. Viscosity and gel strength of the mud were excellent at all depths, while chloride content varied from a minimum of 2,200 parts per million at 9,861 feet to 3,100 parts per million at all depths below 15,394 feet.

During logging at 15,659 feet, a density logging tool was lost twice when the small logging cable broke. No difficulty was encountered in recovering the fish on either occasion. During a total time of five days spent in logging at the total depth, no chemical maintenance of the mud was required.

The total depth was reached in 69 drilling days, and at no time was there any fill-up of objectionable build-up of wall cake on the bore of the well. The well bore was of excellent gauge and good logs were easily obtained.

Mud costs for drilling to the total depth of 15,659 feet were $65,000.00 as compared with other deep wells drilled in the vicinity with other type muds which have required mud costs in the range from $125,000.00 to $200,000.00.

EXAMPLE VIII

A well in Cameron Parish, Louisiana, penetrating the hackberry shale, an easily hydratable and troublesome shale was drilled from a depth of 8,360 feet to 11,000 feet using an XP20-chrome lignosulfonate mud. The water-loss characteristics of the mud continually improved at increasing depths varying from a maximum of 4.2 at 8,360 feet to 1.1 at 11,000 feet, while the viscosity remained good at all depths. Both mud and the walls of the hole remained in good condition at all times, and logs were run without trouble at the total depth.

An offset well was drilled using a gyp-chrome lignosulfonate mud. The total mud cost of this well to 11,000 feet was $20,000.00, but electric logs could not go to the bottom and an additional $5,000.00 was spent in conditioning the mud to permit logging, thus raising the mud cost to $25,000.00.

The total cost of mud in the well drilled using XP20-chrome lignosulfonate mud, was $15,000.00, thus saving approximately 40 percent in mud costs over the costs in the offset well.

EXAMPLE IX

Experimental work was conducted to compare the hydration inhibiting effects of filtrates from XP20-chrome lignosulfonate muds with filtrates from other widely used muds.

A core of Atoka shale, a highly hydratable and troublesome shale, was recovered from an oil well in Latimer County, Oklahoma. Slugs were cut from this core of shale having a length of 3⅜", a width of ¾" and a thickness of ¾", thus giving a surface area of 5.24 square inches for each slug. The slugs each weighed 39.4 grams ±0.3 gram.

(1) A low pH oil emulsion mud, similar to muds widely used in drilling this troublesome shale stratum was prepared, having the following composition:

Bentonite, High Yield Clay, drilling solids, 1 pound per barrel of a partially hydrolyzed acrylonitrile polymer fluid loss reducing agent, ½ pound per barrel of lignite, 10 percent diesel oil, and 0/25 pounds per barrel of caustic to give a final pH of 9.5.

(2) A simulated gyp-chrome lignosulfonate mud filtrate was prepared by adding 6 pounds per barrel of gypsum, 4 pounds per barrel of chrome lignosulfonate, and caustic sufficient to give a pH of 9.5 in distilled water.

(3) A simulated XP20-chrome lignosulfonate mud filtrate was prepared by adding 6 pounds per barrel of lignosulfonate, 4 pounds per barrel of XP20, and caustic to give a pH of 9.5 to distilled water.

The mud was pressed to give a filtrate sufficient to submerge a slug of the Atoka shale in a vessel, and the filtrate was allowed to stand in contact with the slug at room temperature. Other slugs of shale were submerged in the simulated filtrates of gyp-chrome lignosulfonate and chrome lignosulfonate chrome lignite muds.

The slug covered with filtrate from the low pH oil emulsion mud remained intact for 8 days before cracks appeared. Very severe cracking was noted after 19 days contact with the filtrate.

The slug submerged in the simulated filtrate from gyp chrome-lignosulfonate mud remained intact for 5 days before cracks appeared. After 5 days, progressive cracking was noted, and at the end of the test period (19 days) the slug was severely cracked.

The slug exposed to the simulated XP20-chrome lignosulfonate filtrate remained intact for 12 days before any cracking became apparent. Only minor cracking was noted at the end of 19 days.

A fourth slug of the Atoka shale was treated with distilled water as a control. This slug cracked immediately upon contact with the water and began to disintegrate after 3 days.

EXAMPLE X

In order to compare the properties of a base mud, the same mud converted to a chrome lignosulfonate mud, the mud converted to an XP20-lignosulfonate mud, and the same mud treated with lignosulfonate and an unreacted dry blend of the materials which react to form XP20, a native field mud was prepared and was treated as indicated in the tables of FIGS. 1, 2, 3 and 4.

Figure 1:
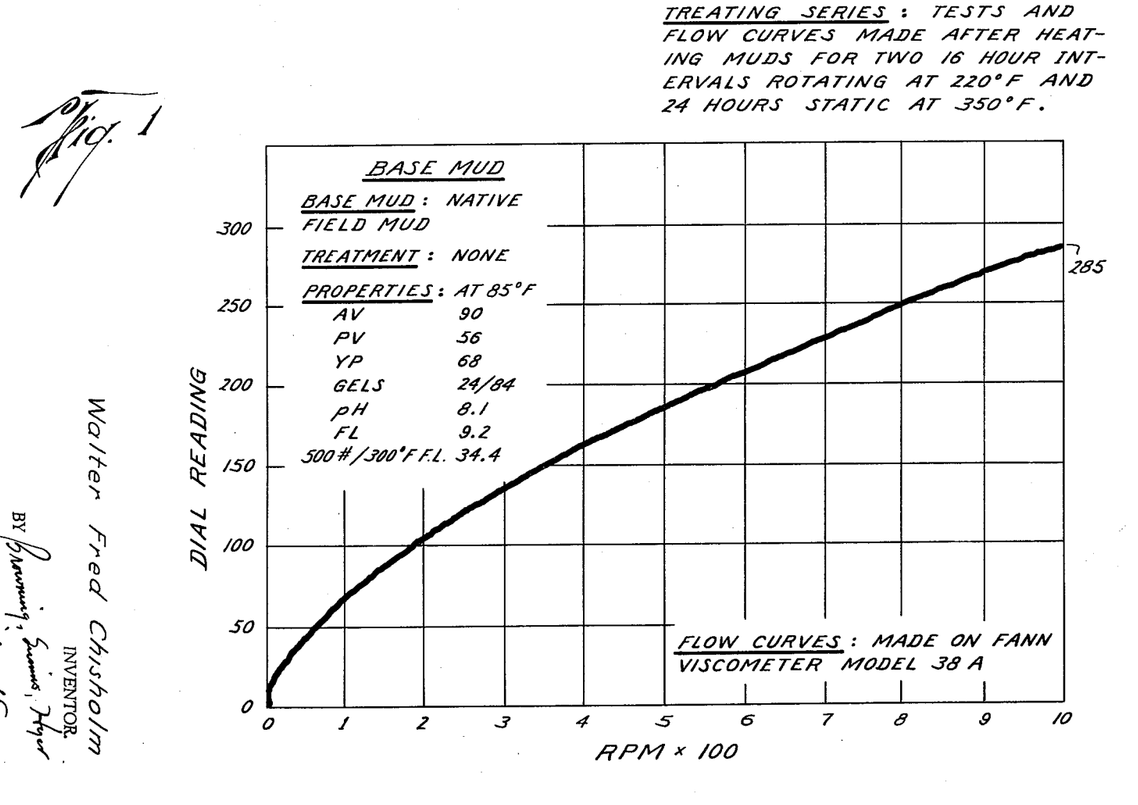
FIGS. 1, 2, 3 and 4 show flow curves obtained by use of a Fann viscosimeter having a recorder attachment and illustrate, respectively, flow curves for a native field mud, for the same mud treated with 8 lbs./bbl. of chrome lignosulfonate, for the field mud treated with 6 lbs./bbl. of chrome lignosulfonate and 2 lbs./bbl. of a preferred pre-reacted chrome-lignite material, and for the same field mud treated with 6 lbs./bbl. of chrome lignosulfonate and 2 lbs./bbl. of an apparently dry blend of lignite, sodium dichromate and potassium hydroxide, in relative proportions identical with those used in preparing the pre-reacted material.
Figure 2:
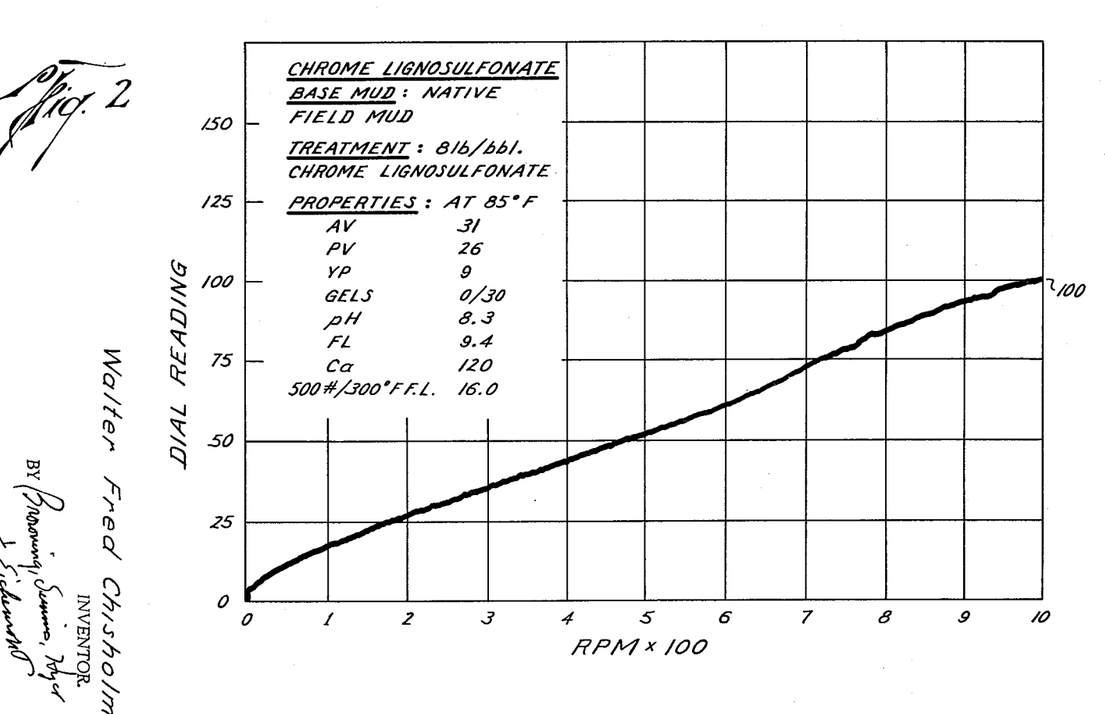
Figure 3:
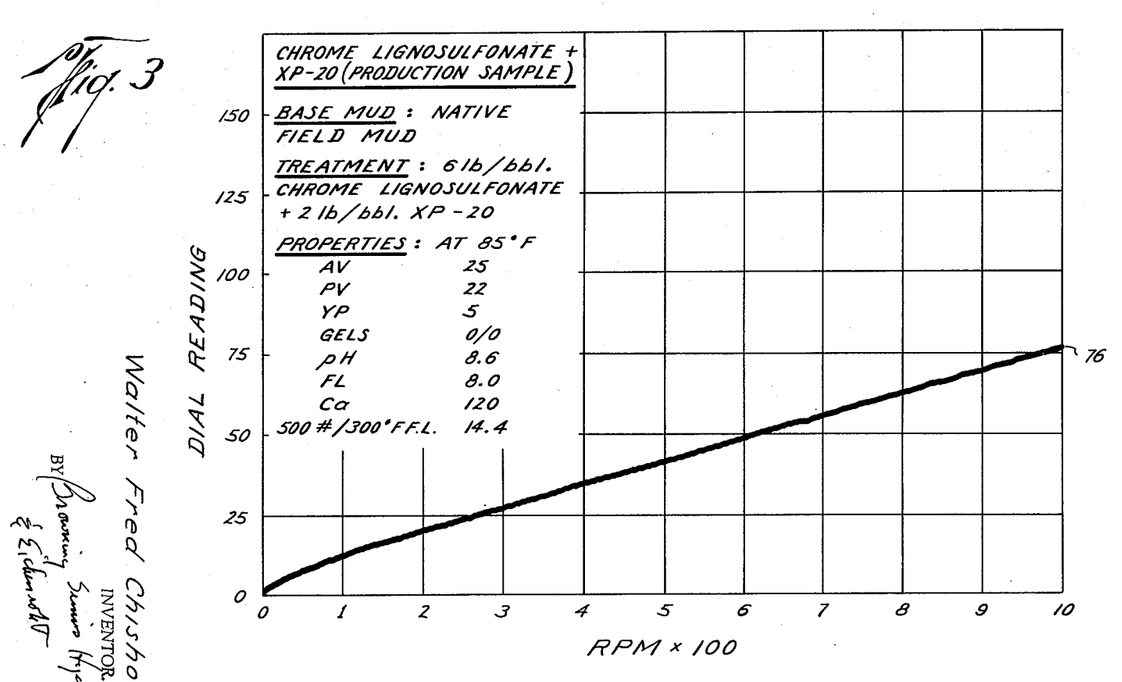

Flow curves were made on each of these muds using a Fann viscosimeter, Model 28A having a recorder attachment. The curve obtained with the native field mud was substantially parabolic in shape having a maximum dial reading of 285 as shown in FIG. 1. The flow curve obtained with the same mud after treating with 8 pounds per barrel of chrome lignosulfonate was almost a straight line with maximum dial reading of 100, shown in FIG. 2. The base mud treated with 6 pounds per barrel of chrome lignosulfonate and 2 pounds per barrel of XP20 gave a flow curve which was substantially a straight line having a maximum value of 76, shown in FIG. 3.

Figure 4:
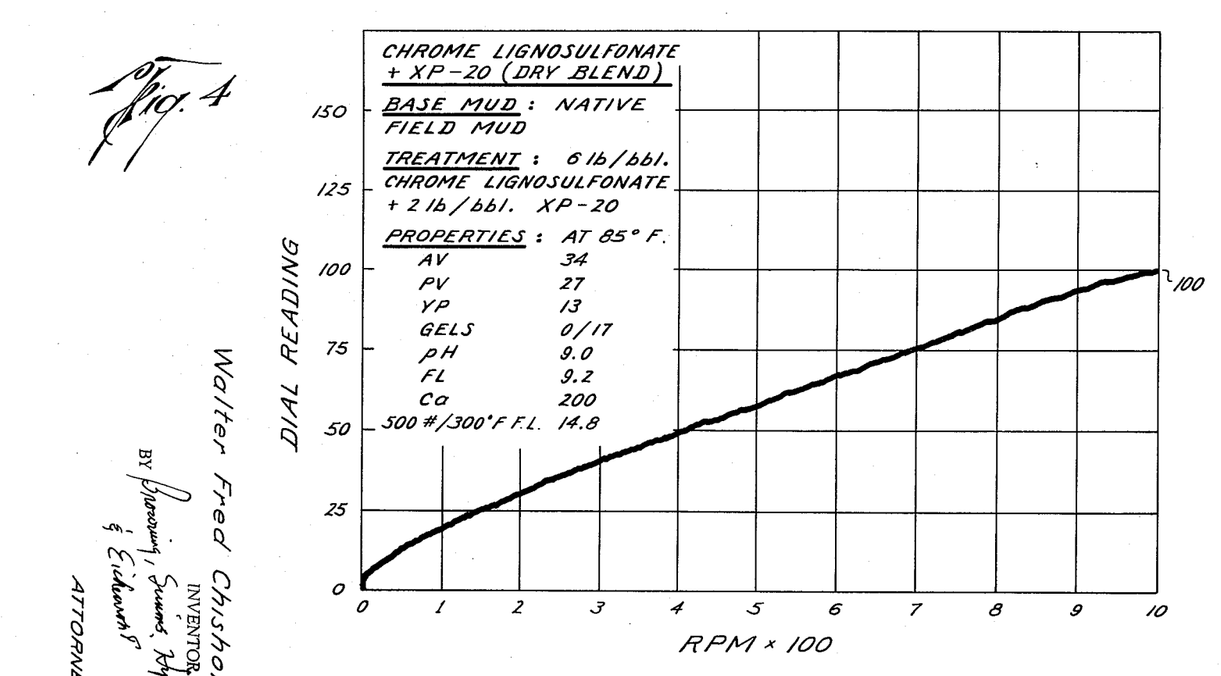
Figure 5:
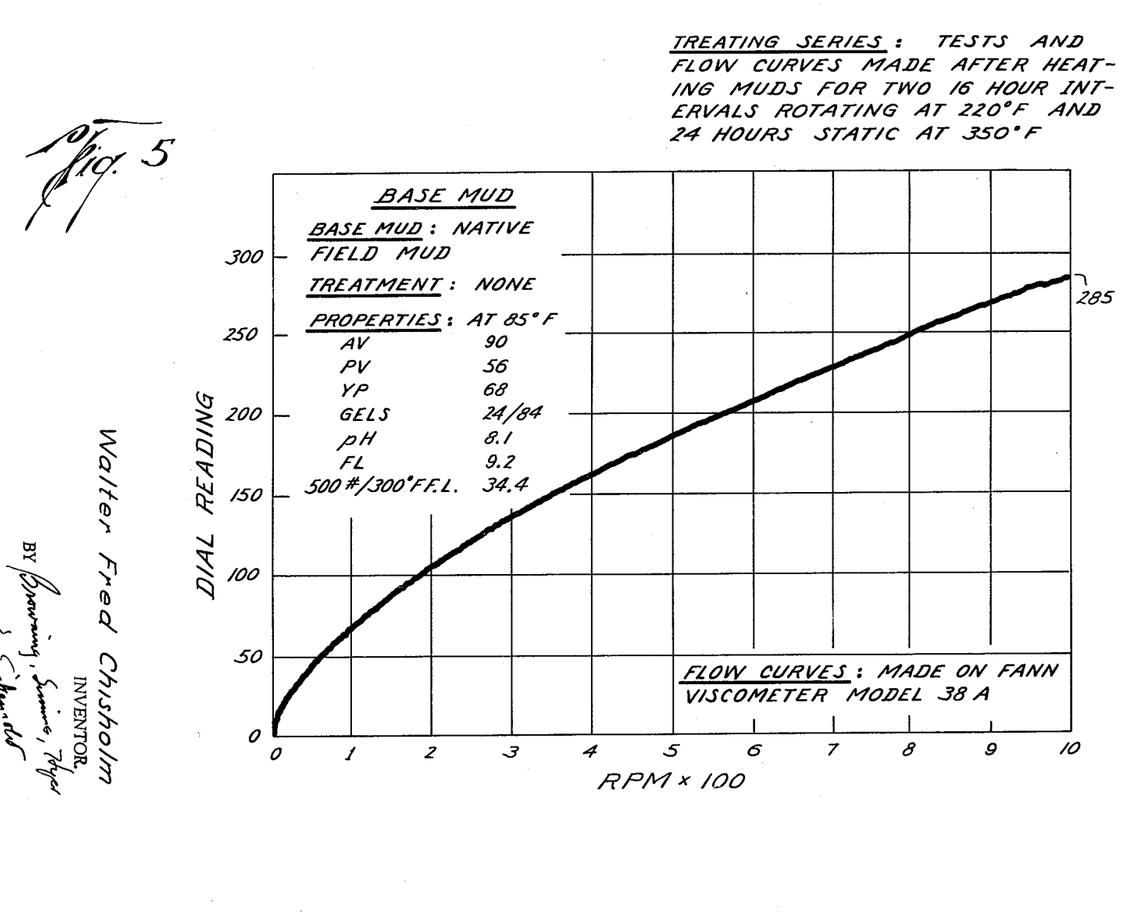
FIGS. 5, 6, 7 and 8 show a similar series of flow curves obtained in the same manner and illustrate respectively flow curves of the field mud, and the same mud after the same series of treatments described under FIGS. 1–4, except that the muds whose flow curves are shown in FIGS. 6, 7 and 8 also contained 6 lbs./bbl. of gypsum.

The base mud treated with 6 pounds per barrel of chrome lignosulfonate and 2 pounds per barrel of an apparently dry blend of the ingredients which react to form XP20 (lignite 100 parts (dry basis), sodium dichromate dihydrate about 8 parts, and sufficient potassium hydroxide to give pH 10.0) gave a substantially straight line flow curve having a maximum value of 100, shown in FIG. 4.

A similar series of experiments were conducted upon the same base mud treated with gypsum in addition to chrome lignosulfonate and XP20, and the dry blend. These muds had the properties shown in the tables in FIGS. 5, 6, 7 and 8.

Figure 6:
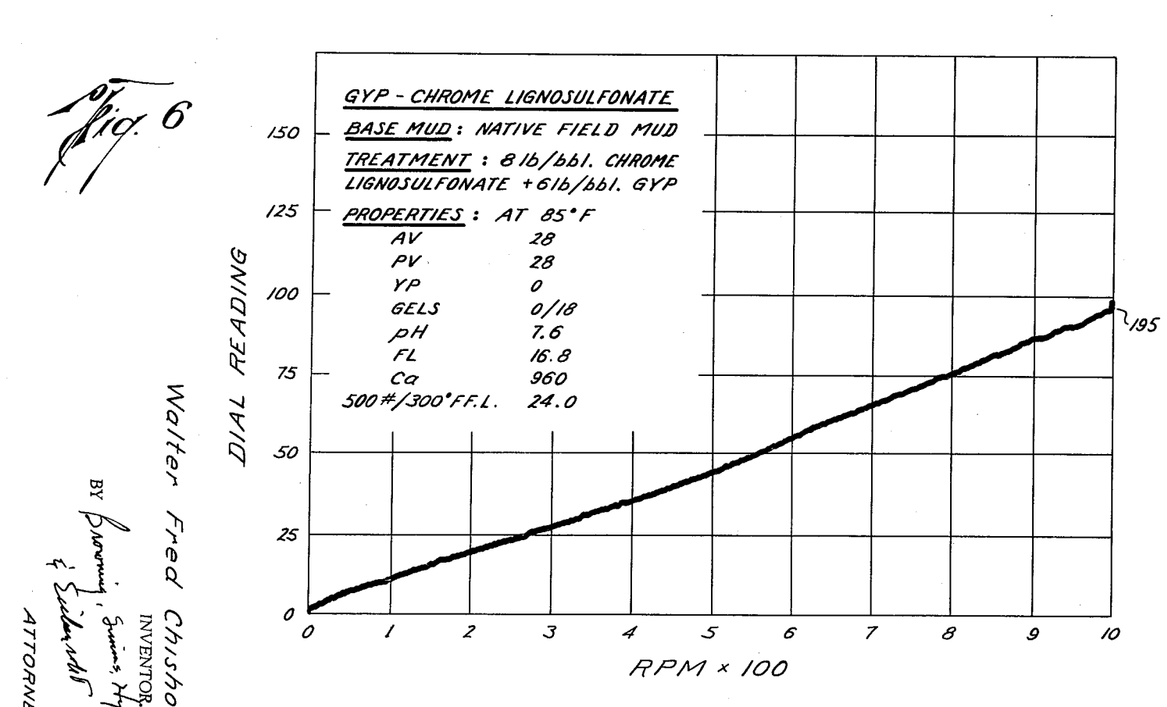
Figure 7:
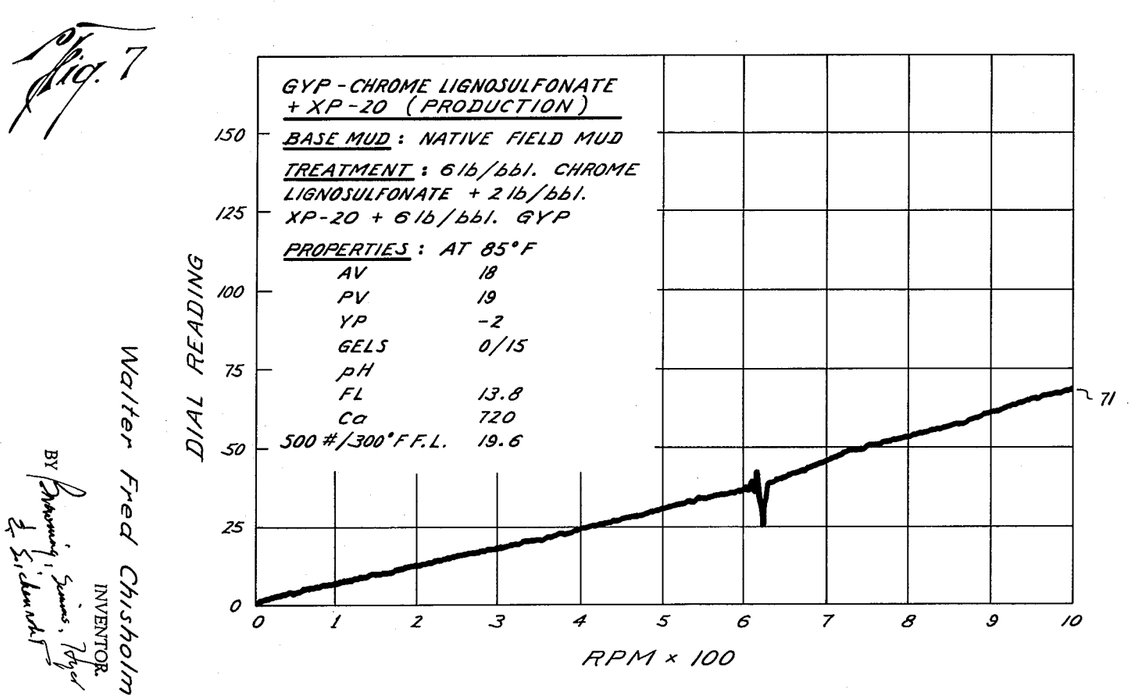
Figure 8:
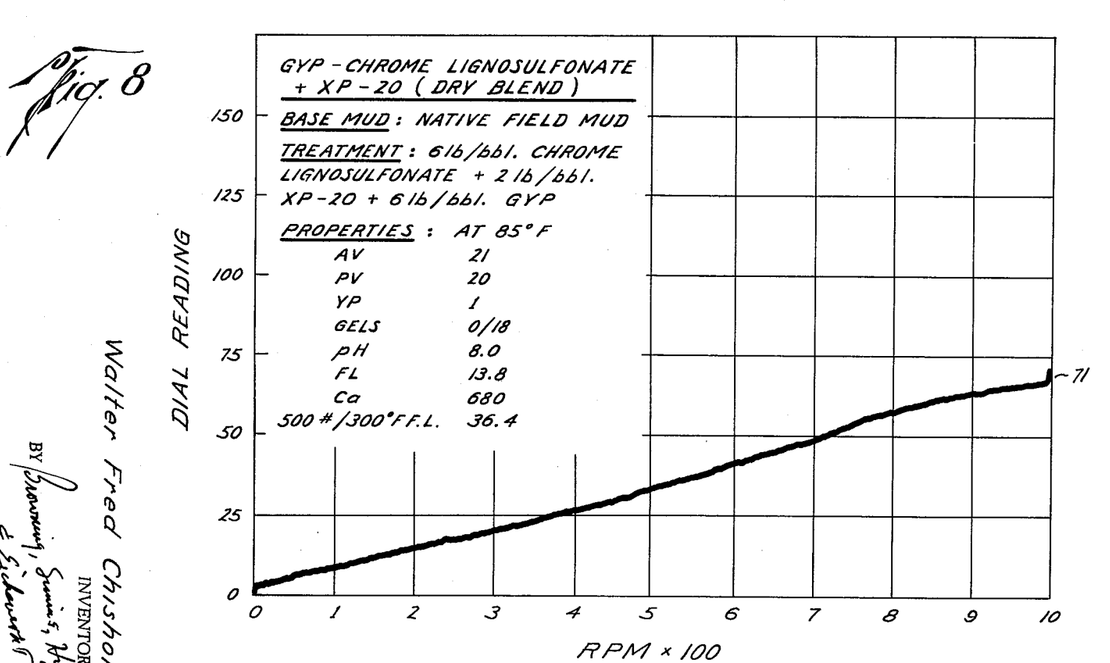

The Fann viscosimeter flow curve on the mud containing 8 pounds per barrel of lignosulfonate and 6 pounds per barrel of gypsum was substantially a straight line having a maximum value of 195, shown in FIG. 6. The same gyp mud treated with 6 pounds per barrel of chrome lignosulfonate and 2 pounds per barrel of XP20 also gave a substantially straight line flow curve, but the maximum value was lowered to 71, as shown in FIG. 7. The mud treated with 6 pounds per barrel of chrome lignosulfonate and 2 pounds per barrel of a dry blend of the ingredients of XP20 and 6 pounds per barrel of gypsum also gave substantially a straight line flow curve having a maximum of 71, shown in FIG. 8.

On inspection of these flow curves and other properties of the muds tabulated on the corresponding figures, it will be seen that a mud treated with the dry ingredients used in the preparation of XP20 have greatly improved properties, but that this improvement is not so great as is shown by the same muds treated with the pre-reacted XP20.

EXAMPLE XI

In order to determine comparative filtration behavior between muds treated with XP20 and chrome lignosulfonate and conventional inhibitive muds, a field gyp mud treated with chrome lignosulfonate and a field mud treated with XP20 and chrome lignosulfonate were obtained for testing. The gyp mud, considered to be an above average mud of this type, had a weight of 16.4 pounds per gallon, contained 33% solids by volume, and had an A.P.I. filtration of 2.6 cc. The XP20-chrome lignosulfonate mud, considered to be typical of a mud of this type, was taken from a drilling well. This mud had a weight of 16.2 pounds per gallon, a solids content of 35% by volume, and an A.P.I. filtration of 2.6 cc. The table below shows comparative data on each mud at pressures of 100 and 500 pounds per square inch and at temperatures of 76, 200, and 400 degrees F.

| P.s.i. | Degrees F. | XP-20 mud 30-min. F.L. (cc.) | Gyp mud 30-min. F.L. (cc.) |
|---|---|---|---|
| 100 | 76 | 2.6 | 2.6 |
| 500 | 76 | 2.2 | 4.0 |
| 100 | 200 | 6.3 | 5.5 |
| 500 | 200 | 5.7 | 7.3 |
| 100 | 400 | 15.0 | 14.5 |
| 500 | 400 | 11.1 | 20.5 |

Both muds show increased filtration with increased temperatures, which is normal. At a given temperature, increasing the pressure on the XP–20 mud results in a decrease in fluid loss, whereas, with a gyp mud at a given temperature, increasing the pressure shows a marked increase in the fluid loss. This comparison illustrates the compressive nature of the XP–20-chrome lignosulfonate mud filter cake, which is not characteristic of a gyp-type mud. The improved filtration characteristics of the XP–20 mud in a drilling operation greatly decreases the likelihood of hole trouble such as stuck pipe, excessive dragging and torque, and sloughing shale.

EXAMPLE XII

Laboratory experiments were conducted to compare the pumpability of a good field gyp mud, the same mud with sodium dichromate added, the field mud with chrome lignosulfonate added, and the same mud with both chrome lignosulfonate and XP–20 added. The experiments were set up to determine the temperatures at which the various muds become unpumpable at a pressure of 10,000 p.s.i.g.

It was found that the field gyp mud gelled to an unpumpable substantially solid mixture at a temperature of 305 degrees F. at this pressure. Addition of one-half pound per barrel of sodium dichromate to the mud increased the temperature required to cause the mud to set to an unpumpable mass to 350 degrees F. The gyp mud with chrome lignosulfonate added solidified at about 400 degrees F.

Another sample of the same mud having both chrome lignosulfonate and XP20 added remained pumpable after prolonged heating at 505 degrees F. at 10,000 p.s.i.g.

EXAMPLE XIII

The following data was obtained in laboratory tests comparing the effect of XP20 on filtration properties of muds prepared with chrome lignosulfonates, one lignosulfonate containing added iron and the other without iron. The base mud was prepared with 5% bentonite plus 20 pounds per barrel drill solids plus barite to weight the mud to 14 pounds per gallon. Test No. 1 shows filtration data on the base mud treated only with 20 pounds per barrel of chrome lignosulfonate containing iron and with a combination of 13 pounds per barrel of chrome lignosulfonate with 7 pounds per barrel of XP–20. Test No. 2 is a repeat of the same procedure using a chrome lignosulfonate without iron.

| | A.P.I. F.L. (cc.) | 500 lb.— 300° F. F.L. (cc.) |
|---|---|---|
| Base mud | 11.6 | 50.0 |
| No. 1 | 3.4 | 19.2 |
| No. 1 with XP-20 | 3.0 | 11.4 |
| No. 2 | 3.0 | 13.2 |
| No. 2 with XP-20 | 2.8 | 11.2 |

The test above indicates that XP–20 functions efficiently in reducing filtration of muds in combination both with chrome lignosulfonates containing iron and with lignosulfonates prepared without addition of iron.

From the foregoing, it will be seen that this invention is one well adapted to attain all of the ends and objects hereinabove set forth, together with other advantages which are obvious and which are inherent to the process and method.

It will be understood that certain features and subcombinations are of utility and may be employed without reference to other features and subcombinations. This is contemplated by and is within the scope of the claims.

The invention having been described, what is claimed is:

1. A fluid useful in drilling, completion and workover of wells comprising water; a clayey material; chrome lignosulfonate; an alkali metal hydroxide in quantity sufficient to maintain the fluid in alkaline condition; lignite; and a chromate material selected from the group consisting of alkali metal chromates and dichromates in quantity equivalent to 5 to 25 pounds of sodium dichromate dihydrate per hundred pounds of lignite; said lignite and chromate material together being present in a total amount of from 1 to 15 pounds per barrel of said fluid.

2. The fluid of claim 1 wherein the chromate material is sodium dichromate.

3. A fluid useful in drilling, completion and workover of wells comprising water; clayey material; chrome lignosulfonate; an alkali metal hydroxide sufficient to maintain the liquid in alkaline condition; and from 1 to 15 pounds per barrel of a chrome lignite material made by mixing lignite, a chromate material selected from the group consisting of alkali metal chromates and dichromates in quantity equivalent to 5 to 25 pounds of sodium dichromate dihydrate per hundred pounds of lignite, and an alkali metal hydroxide in quantity sufficient to neutralize the acidity of the mixture.

4. The fluid of claim 3 wherein the chrome lignite material is made by intimately mixing apparently dry lignite, chromate material and alkali metal hydroxide.

5. The fluid of claim 3 wherein the alkali metal hydroxide is potassium hydroxide.

6. The fluid of claim 3 wherein the chromate material is sodium dichromate.

7. A fluid useful in drilling, completion and workover of wells comprising water; a clayey material; chrome lignosulfonate; an alkali metal hydroxide in quantity sufficient to maintain the fluid in alkaline condition; and from 1 to 15 pounds per barrel of a chrome lignite material comprising a reaction product made by mixing together lignite, a chromate material selected from the group consisting of alkali metal chromates and dichromates in quantity equivalent to 5 to 25 pounds of sodium dichromate dihydrate per hundred pounds of lignite, and an alkali metal hydroxide in quantity sufficient to neutralize the acidity of the mixture, in the presence of sufficient water to enable reaction to proceed.

8. The fluid of claim 7 wherein the reaction product is made by mixing lignite, a chromate material selected from the group consisting of alkali metal chromates and dichromates in quantity equivalent to 7 to 14 pounds of sodium dichromate dihydrate per hundred pounds of lignite and an alkali metal hydroxide in quantity at least sufficient to neutralize the acidity of the mixture, in the presence of sufficient water to enable reaction to proceed.

9. The fluid of claim 7 wherein the reaction product is made by mixing lignite, a chromate material selected from the group consisting of alkali metal chromates and dichromates in quantity equivalent to about 8 pounds of sodium dichromate dihydrate per hundred pounds of lignite, and an alkali metal hydroxide in quantity at least sufficient to neutralize the acidity of the mixture, in the presence of sufficient water to enable the reaction to proceed.

10. The fluid of claim 7 wherein said chrome lignosulfonate is present in the fluid in proportion from 1 to 3 parts by weight per part of chrome lignite material.

11. The fluid of claim 7 wherein said chrome lignosulfonate is present in the fluid in proportion of about 2 parts by weight per part of chrome lignite material.

12. The fluid of claim 7 wherein the reaction product is made by mulling lignite with a concentrated sodium dichromate solution and a concentrated aqueous solution of potassium hydroxide and drying the mulled mixture.

13. The fluid of claim 7 wherein the reaction product is made by mulling lignite containing about 10% moisture with a concentrated aqueous solution of a chromate material selected from a group consisting of alkali metal chromates and dichromates in quantity equivalent to 5 to 25 pounds of sodium dichromate dihydrate per hundred pounds of dry lignite, and an alkali metal hydroxide in quantity sufficient to raise the pH of the product to about 10; raising the temperature of the resulting mixture to the range of about 180 degrees to 240 degrees F. by heat of reaction during mulling; and at least partially drying the mulled mixture.

14. The fluid of claim 7 in which the reaction product is made by mixing together an aqueous slurry of lignite, a chromate material selected from the group consisting of alkali metal chromates and dichromates in quantity equivalent to 5 to 25 pounds of sodium dichromate dihydrate per hundred pounds of dry lignite and an alkali metal hydroxide in quantity at least sufficient to neutralize the acidity of the mixture; drying the resulting mixture sufficiently by heating to a temperature above 212 degrees F. to produce a solid granular product.

15. The fluflid of claim 14 wherein the chromate material is sodium dichromate and is mixed with the aqueous slurry of lignite in an amount equivalent to about 8 parts of sodium dichromate dihydrate per hundred pounds of dry lignite and the alkali metal hydroxide in the reaction product is potassium hydroxide in quantity sufficient to cause the product to have a pH of about 10.

16. In a process for drilling a well wherein an alkaline drilling mud comprising water and a clayey material is circulated through the well, the improvement which comprises adding chrome lignosulfonate to the mud and also adding lignite, and a chromate material selected from the group consisting of alkali metal chromates and dichromates in amount equivalent to 5 to 25 pounds of sodium dichromate dihydrate per hundred pounds of lignite, said lignite and chromate material together being present in a total amount of from 1 to 15 pounds per barrel of said mud.

17. The process of claim 16 wherein the chrome ligno sulfonate is mixed with and added together with said lignite and chromate material.

18. The process of claim 16 wherein the lignite and chromate material are added as a reaction product made by mixing lignite, a chromate material selected from the group consisting of alkali metal chromates and dichromates in quantity equivalent to 5 to 25 pounds of sodium dichromate dihydrate per hundred pounds of lignite and an alkali metal hydroxide in quantity at least sufficient to neutralize the acidity of the mixture in the presence of sufficient water to enable the reaction to proceed.

19. The process of claim 16 wherein said chromate material is sodium dichromate.

20. The process of claim 16 wherein the alkali metal hydroxide is potassium hydroxide.

21. The process of claim 16 wherein the lignite and chromate material are added as a reaction product made by mulling lignite containing about 10 to 15% moisture with a concentrated aqueous solution of a chromate material selected from the group consisting of an alkali metal chromate and dichromates in quantity equivalent to 5 to 25 pounds of sodium dichromate dihydrate per hundred pounds of dry lignite and an alkali metal hydroxide in quantity sufficient to raise the pH of the mixture to about 10; raising the temperature during mulling to the range from about 180 degrees to 240 degrees F. by heat of reaction; and at least partially drying the resulting mulled mixture.

22. The process of claim 16 in which the lignite and chromate material are added as a product made by mixing together an aqueous slurry of lignite, sodium dichromate and potassium hydroxide and then drying the resulting product by heating the mixture to a temperature of about 212 degrees F. for a time sufficient to produce a solid granular product, said dichromate being present in the slurry in amount equivalent to about 8 parts sodium dichromate dihydrate per hundred pounds of lignite and the potassium hydroxide being present in quantity sufficient to cause the product to have a pH of about 10.

23. In a process for drilling, completing and working over a well wherein a clayey material in alkaline aqueous suspension is pumped into the well, the improvement which comprises adding to the fluid a chrome lignosulfonate and a chrome lignite material made by intimately mixing lignite, a chromate material selected from the group consisting of alkali metal chromates and dichromates in quantity equivalent to 5 to 25 pounds of sodium dichromate dihydrate per hundred pounds of lignite, and an alkali hydroxide in quantity sufficient to neutralize the acidity of the mixture, said chrome lignosulfonate and chrome lignite material being added in proportions from about 1 to 3 parts of chrome lignosulfonate per part of chrome lignite material.

24. The process of claim 23 wherein the chrome lignosulfonate and chrome lignite material are added together in admixture with each other.

References Cited in the file of this patent

UNITED STATES PATENTS

| | | |
|---|---|---|
| 1,999,766 | Lawton et al. | Apr. 30, 1935 |
| 2,605,221 | Hoeppel | July 29, 1952 |
| 2,650,197 | Rahn | Aug. 25, 1953 |
| 2,721,841 | Fischer | Oct. 25, 1955 |
| 2,782,163 | Wilson | Feb. 19, 1957 |
| 2,813,826 | Crowley et al. | Nov. 19, 1957 |
| 2,868,726 | Brukner et al. | Jan. 13, 1959 |
| 2,871,188 | Watkins | Jan. 27, 1959 |
| 2,894,940 | Sperry | July 14, 1959 |
| 2,935,473 | King et al. | May 3, 1960 |
| 2,935,504 | King et al. | May 3, 1960 |
| 2,965,566 | Hoeppel | Dec. 20, 1960 |